United States Patent [19]
Toyooka et al.

[11] 3,874,067
[45] Apr. 1, 1975

[54] METHOD AND APPARATUS OF BUTT WELDING PIPES OR THE LIKE

[75] Inventors: Terumasa Toyooka; Kiyoshi Terai, both of Hyogo, Japan

[73] Assignee: Kawasaki Jukogyo Kabushiki Kaisha, Hyogo, Japan

[22] Filed: June 7, 1973

[21] Appl. No.: 367,928

[52] U.S. Cl. ................. 29/470.3, 156/73, 156/304, 156/544, 156/580, 228/2, 264/68
[51] Int. Cl. ............................................. B23k 19/00
[58] Field of Search ............ 156/73, 544, 580, 304; 29/470.3; 228/1, 2; 264/68

[56] References Cited
UNITED STATES PATENTS

| | | | |
|---|---|---|---|
| 3,013,925 | 12/1961 | Larsen | 156/304 X |
| 3,276,941 | 10/1966 | Burns | 156/304 X |
| 3,702,674 | 11/1972 | Bodine | 29/470.3 X |
| 3,745,641 | 7/1973 | Paolini | 29/470.3 |
| 3,829,360 | 4/1973 | McElroy | 156/304 X |

*Primary Examiner*—Edward G. Whitby
*Attorney, Agent, or Firm*—Sughrue, Rothwell, Mion, Zinn & Macpeak

[57] ABSTRACT

The ends of two pipes or rods to be butt welded are beveled to form a V-shaped groove when abutting opening toward the outer periphery, a ring of metal of corresponding size and V-shaped configuration to the groove is positioned within the groove and the ring is forcibly rotated about the axis of the pipe or rod, while compressing the pipes or rods together. The heat of friction fully plasticizes the ends of the pipes or rods and the ring, rotation of the ring ceases and final compression between the pipes effects welding. Alternatively, the ends of the pipes are at right angles to the pipe axis and the ring comprises a short section of pipe corresponding to the two pipes to be butt welded.

3 Claims, 8 Drawing Figures

3,874,067

METHOD AND APPARATUS OF BUTT WELDING PIPES OR THE LIKE

BACKGROUND OF THE INVENTION

1. Field of the Invention

This invention relates to the butt welding of pipes or rods and more particularly, to the welding of the abutting ends of the pipes or rods by the application of friction heat.

2. Description of the Prior Art

The friction welding of pipes or rods has been carried out in the past as illustrated in FIG. 1 by rotating one pipe or rod about its longitudinal axis at relatively high speed and under high compression against the end of the other stationary pipe or rod so as to elevate the temperature of the contact zone between sections to the welding temperature, abruptly stopping the rotation of the rotating pipe or rod and applying a final compressive force between the pipe or rod section to thereby weld the sections together.

Another prior art friction welding process often employed is shown in FIG. 2, wherein three pipes or rods are arranged in abutting end to end fashion, along a common axis, to form two contact zones and the central pipe or rod is rotated while applying compressive force to the contact zone, for instance, from one end of a given outside pipe or rod as identified by the arrow 2, whereby, the two contact zones are simultaneously friction welded.

In either case, the friction welding process requires the rotation of one of the rods or pipes at high speed and to abruptly stop that section after the contact zone is elevated to welding temperature. Accordingly, the friction welding process of the prior art has not been applied to large size articles, and the maximum diameter of pipe or rod generally welded by the described friction welding processes is at most 100 mm., and the application of this type of welding is generally restricted to short pipes or rods if the pipes or rods are of relatively large diameter.

On the other hand, large scale friction welders are necessary to build long distance pipeline in recent years. For example, FIG. 3 illustrates in perspective, a large scale friction welder described in "Metal Construction and British Welding Journal" issue of May 1970, page 198, wherein the welder is mounted on a pair of catapillar trucks driven by diesel engine and employed in the welding of long and large diameter pipes. In FIG. 3, the operator chamber 7 is shown as positioned adjacent a pair of diesel engines 7 which act to drive oil pumps 8, the operator standing further close to welding part 9. 10 indicates a roller at a fixed side, 11 a rotating work head, 12 an oil pressure driven motor, 13 a pipe to be friction welded, and 14 the next pipe to be welded in succession to that of pipe 13. In operation of the illustrated friction welder of FIG. 3, the heavy, long and large diameter pipe may be rotated while keeping it exactly in proper axial position but the abrupt stopping of the rotating heavy pipe once heated at the welding temperature in the area of abutment with the adjacent stationary pipe is technically difficult to achieve. Besides, surface projections in the form of fins, are formed inside the pipe, which are peculiar to the friction welding of pipes and the removal of such fins is quite troublesome.

The present invention is intended to solve the problems caused by the application of friction welding methods to heavy and large size pipes or rods and to overcome the difficulty in aburptly stopping the high speed rotation of such heavy pipes as well as the difficulty in removing the fins formed inside of the pipe at the welded zones. The present invention is also intended to provide a friction welding process which is capable of simultaneously welding a plurality of small diameter pipes or rods.

SUMMARY OF THE INVENTION

The friction welding process of the present invention is characterized in one form by beveling the ends of the abutting pipes or rods to be butt welded to form a V-shaped groove therebetween, which diverges in the direction of the outer periphery of the pipe or rod when the ends of the two pipes or two rods ar brought into contact with each other, inserting a ring of the same metal as that of the pipes or rods or like suitable metallic material having a cross section of corresponding V-shape or in the form of a symmetrical or unsymmetrical trapezoid within the V-shaped groove prior to welding, forcibly rotating the embedded ring about the axis of the pipe or rod while applying initial compression to the pipes, elevating the temperature of the ends of the pipes or rods and the inserted ring by the heat of friction created by rotating the ring in contact with the stationary pipes until fairly plasticized, and then applying final compression between the pipes to weld the pipes or rods at the V-shaped groove.

Alternatively, the ends of the abutting pipes or rods are not beveled but are at right angles to the axis of the pipes or rods and the insert ring comprises a short piece of pipe or rod corresponding to those to be butt welded, the short piece of pipe or rod carrying teeth on its outer periphery or being supported in turn by a ring gear concentrically surrounding the short piece of pipe and driven in like manner preferably by a rotating driving gear enmeshed therewith.

DESCRIPTION OF PREFERRED EMBODIMENTS

Figure 1:
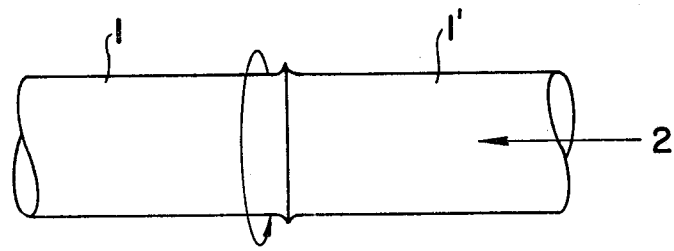
FIG. 1 is a side elevational view of a pair of pipes being friction welded together by common prior art process.
Figure 2:
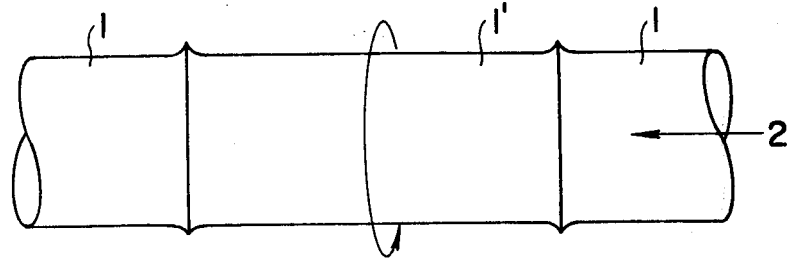
FIG. 2 is a side elevational view of three pipe sections whose abutting edges are friction welded by another prior art welding process.
Figure 4:
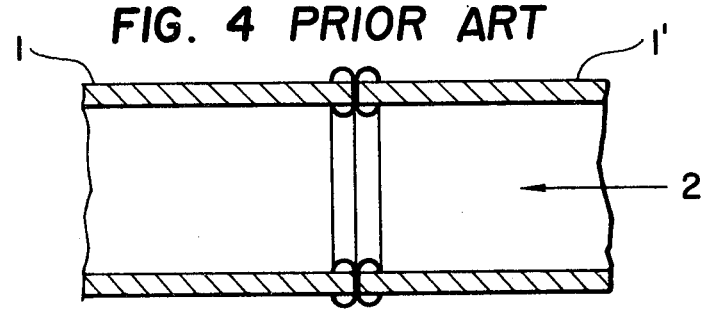
FIG. 4 is a longitudinal cross section of the welded pipes of the prior art processes illustrating the attending fin formation.
Figure 5:
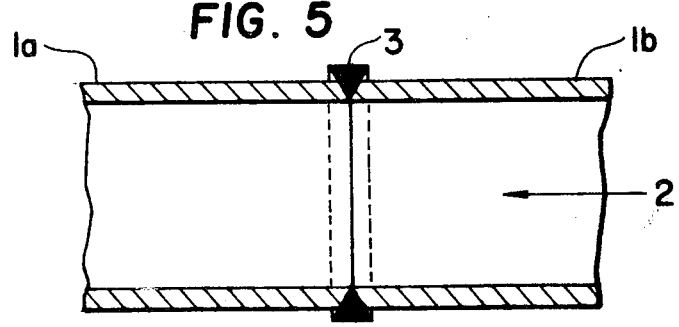
FIG. 5 is a longitudinal cross section of two pipes to be welded by the friction welding process of the present invention through the use of an insert ring between abutting ends of the pipe sections.
Figure 3:
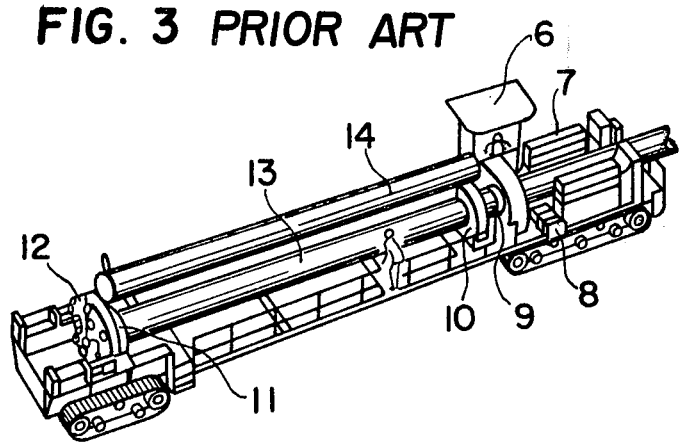
FIG. 3 is a perspective view of a large scale friction welder of the prior art employing a conventional friction welding process illustrated in FIG. 1.
Figure 6:
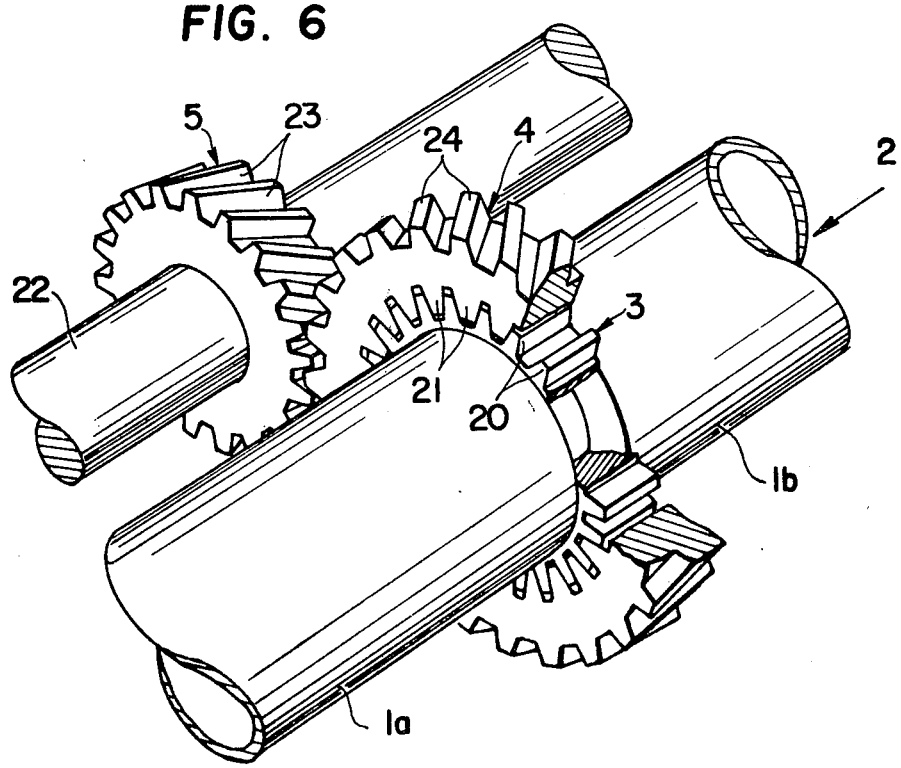
FIG. 6 is a perspective view of one mechanism for forcibly rotating the insert ring of the arrangement of FIG. 5 to effect friction welding by the process of the present invention as applied to a pair of end abutting pipes.
Figure 7:
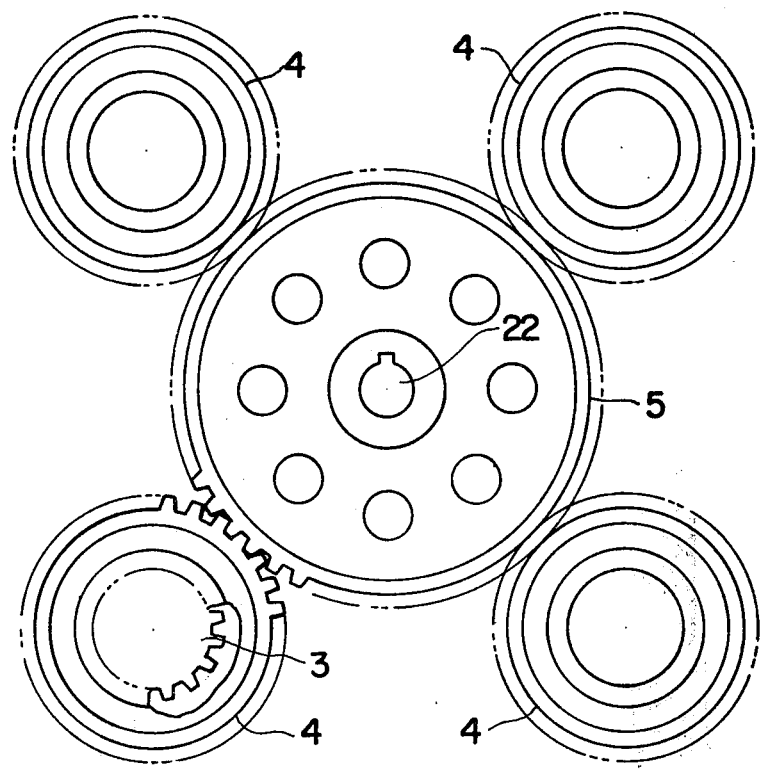
FIG. 7 is a schematic end view of an arrangement of a plural group of end abutting pipes, interposed ring and a gear drive system for simultaneously friction welding a plurality of pipe at circumferentially spaced positions about a central drive gear under the friction welding process of the present invention.

The present invention in one form is illustrated in FIGS. 5, 6 and 7, in FIG. 5 the abutting ends of pipes 1 and 1' are illustrated as being beveled at their edges in oppositely inclined fashion to provide an outwardly diverging V-shaped groove or gap within which is positioned a ring formed of the same metal making up the pipes 1a and 1b or of a different but compatible metal but of complementary V-shaped cross section configuration. The arrow 2, as in FIGS. 1, 2 and 4, illustrates the direction of applied compressive force acting through pipe 1b on pipe 1a, and the ring 3 which is inserted within the V-shaped groove defined by the beveled edges of the pipes. Under the broad method of the present invention, the inserting ring 3 is placed in abutting position relative to the beveled end of one of the pipes, for instance, pipe 1a. Then, as evidenced further in FIG. 6, with the insert ring 3 being preferably provided with gear teeth 20 about its outer periphery, a driving gear 4 is mounted thereon by interengagement of teeth 21 on the inner periphery of ring gear 4, having similar pitch, and configuration to those of the gear teeth 20 on the insert ring 3. The ring gear 4 may be initially positioned on the insert ring 3 prior to the insert ring being abutted against pipe 1a, for instance, or alternatively, prior to moving the second pipe 1b axially into abutting position with the opposite end face of ring gear 3 or ring gear 4 may be axially slid onto the assembly of the coaxial pipes consisting of the two pipes 1a and 1b and the insert ring 3 filling the V-shaped groove defined by the beveled ends of pipes 1a and 1b. In FIG. 6, drive shaft 22 has fixed thereto a drive gear 5 whose teeth 23 mesh with teeth 24 provided on the outer periphery of the ring gear 4 and when the drive shaft 22 is rotated in either direction, positive rotation of the insert ring 3 results, creating friction at the interface between the ring gear 3 and the beveled end of pipes 1a and 1b. As both the beveled ends of the stationary pipes 1a and 1b and that of the insert ring 3 are well machines, there is effected an intimate contact between these elements over the complete beveled surface contact area and centering is not necessary. Centering is effected automatically as a result of the thrust force indicated by arrow 2 acting through pipe 1b on the insert ring 3 and on the other rotatably fixed pipe 1a. An initial compressive force is exerted as evidenced by arrow 2 in FIGS. 5 and 6 longitudinally of the abutting pipes while rotation of drive shaft 22 forcibly drives the insert ring 3 at high speed, via ring gear 4. As a result, both the side faces of the insert ring 3 and the beveled ends of the pipes 1a and 1b are heated by friction, especially the insert ring 3 which has a smaller heat content as compared to that of the large pipes, and thus the insert ring 3 is rapidly heated. When the welding zone defined by these contacting surfaces is heated to welding temperature, the rotation of the insert ring 3 is abruptly stopped by terminating rotation of drive shaft 22 and a final increased compressive force is applied to the pipe 1b in the direction of arrow 2, whereby the plasticized insert ring 3 is welded to both pipe ends while being thrust radially outward by the wedging action of the beveled ends of pipes 1a and 1b. As the mass of the insert ring 3 is small, the abrupt stopping of ring 3 may be easily achieved with little energy in contrast to the prior art method illustrated in FIG. 3. Further, contrary to the illustrated longitudinal sectional view of FIG. 4, fins which are formed as result of welding do not emerge on the inner periphery of the welded pipe, but because of the wedge action created by the beveled ends of pipes 1a and 1b on the insert ring 3, the fins are thrusted radially outward. The same effect is achieved if the groove and the insert ring is trapezoid in cross section. Further, the fins and their tendency to form on the inner periphery of the welded pipe may be regulated by changing the shape of the cross section of the insert ring 3, the groove which receives the same, the degree of compression and the magnitude of the final compression force acting on the weld area.

Besides, the friction welding process of the present invention requires a relatively small size and compact driving means and the driving force may be effected by remote controlled electric motor or hydraulic motor which permits changing of the rotary velocity of the insert ring 3 through the driving gear 5 and the ring gear 4, since the rotation force is applied exclusively to the small insert ring 3 and the pipe 1a and 1b while being subjected to a compressive force are angularly fixed. Furthermore, since the insert ring does not melt, the welding can be carried out at any angular inclination, that is, the longitudinal axis of the pipe assembly may be vertical or horizontal or in between. Further, the process is applicable to the welding of members of mutually different material and is easily achieved, and the members may be formed of special metals which are non-weldable by the usual arc welding processes.

Turning to FIG. 7, there is illustrated schematically the process as applied to a system for welding simultaneously a plurality of pipes or rods by arranging a series of ring gears 4 in a circumferentially spaced fashion about the periphery of a drive gear 5 driven by a shaft 22 such that the single drive gear 5 simultaneously rotates in this case four insert rings associated with four different groups of abutting pipes. To effect stability in a multiple welding machine employing the process of the present invention, the ring gear 4 at each weld location may be stabilized by employing multiple gears whose axes are fixed in mesh with the gear teeth on the outer periphery of the ring gear 4.

While the shape of the groove defined by the beveled ends of the pipe has been illustrated as being V-shaped and diverging outwardly, the groove and the insert ring whose surfaces are complementary thereto may take the form of a symmetrical or unsymmetrical trapezoid, however the ends of the pipes should be beveled to the extent that the compressive force acting on the weld area tends to force the plasticized metal within the groove radially outward during friction welding to insure the elimination of fins on the pipe interior, these fins being readily removable if limited to the exterior of the welded pipe at the friction welded joints.

Figure 8:
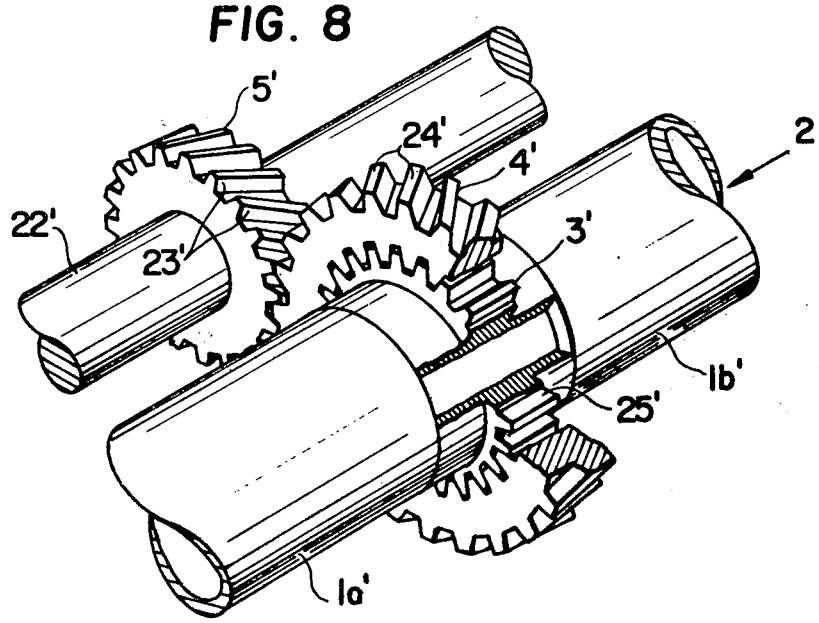
FIG. 8 is a perspective view partially broken away of a second embodiment of the present invention, wherein a short insert pipe is butt welded to a pair of elongated pipes in end abutment therewith.

In an alternate embodiment of the invention, illustrated in FIG. 8, a drive shaft 22' has fixed thereto a drive gear 5' whose teeth 23' mesh with teeth 24' provided on the outer periphery of ring gear 4', and when the drive shaft 22' is rotated in either direction, positive rotation of insert 3' results, creating friction at the interface between the insert 3' and the ends of pipes 1a' and 1b', much in the same manner as the embodiment of FIG. 6. However, in this case, instead of having beveled ends for the stationary pipes 1a and 1b as in the embodiment of FIG. 6, the pipes 1a' and 1b' have ends which define end surface planes which are at right angles to the axis of the pipes. In turn, the insert 3' in this case is not a ring having conforming beveled surfaces, but is in fact a short length of pipe identical in thickness, material and size to the pipes 1a' and 1b' and preferably is provided with integral gear teeth as at 25' on its periphery, the gear teeth 25' extending axially only the distance of the thickness or width of ring gear 4'. Other than employing a ring gear 4', sprockets or like holding means may be provided on the outer periphery of the intermediate pipe or insert 3' directly or via a gear joint.

In operation, in similar fashion to the prior embodiment of FIG. 6, the pipes 1a' and 1b' as well as the intermediate range or short pipe 3' are arranged in line so as to lie coaxially. Then by rotation of shaft 22' while pipes 1a' and 1b' are fixed (by means not shown) and while compressive force is exerted in opposite directions on pipes 1a' and 1b' as indicated by arrows 2', the relative rotation between the short pipe 3' and pipes 1a' and 1b' under the compressive force causes a large amount of friction heat to be generated on both contact zones 6a and 6b. When the temperature of the contact zones is elevated to the welding temperature, the rotation of the short pipe 3' abruptly ceases and a final compression force is applied axially between all three pipes 3', 1a' and 1b' either from both ends or from one end only, to weld the two pipes 1a' and 1b' together through the use of the intermediate or insert pipe 3'.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of butt welding pipes comprising the steps of:
    beveling the ends of the pipe to be butt welded to form opposed outwardly diverging surfaces,
    inserting a metal ring of corresponding size and thickness and having correspondingly oppositely diverging end surfaces between said pipes and in end abutting position with respect to said pipes to be joined,
    forcibly rotating the inserted ring about a common axis including the pipes and the ring while applying compressive force between the pipes and the ring to elevate the temperatures of the ends of the pipes and the ring by the heat of friction,
    terminating rotation of the ring, and
    applying final compression between the pipes to butt weld said pipes by means of said ring, with said ring being provided with a cross section corresponding to that of the diverging groove formed between the pipes when abutting;
    whereby, fins resulting from welding do not form on the inner periphery of the welded pipe, and any fins formed by the wedge action of the beveled ends of the pipe acting on the insert ring are formed radially outward permitting subsequent removal from the exterior surface of the butt welded pipes.

2. An apparatus for butt welding at least one pair of end abutting pipes or the like, said apparatus comprising:
    means for supporting at least two pipes in end to end coaxial position,
    means for supporting a metal ring having complementary end surfaces in contact with the ends of said respective pipes,
    means for applying compression between said pipes and said insert ring,
    means for selectively rotating said ring about a common axis between said pipe and said insert ring,
    said insert ring including gear teeth about its outer periphery,
    a gear ring internal and external gear teeth in mesh with said insert ring to effect rotation of said insert ring about the full periphery of the same by said intermeshed internal and external teeth of said gear ring and said insert ring respectively;
    whereby, said insert ring is rotated to elevate the temperature of the pipe ends by said gear ring acting on the full periphery of said insert ring by the heat of friction developed by rotation of said insert ring to plasticize the same, rotation of the ring is terminated and final compression between said pipes welds the ends of the pipes together via said insert ring.

3. An apparatus for butt welding a plurality of pairs of axially positioned end to end pipes simultaneously, said apparatus comprising:
    means for supporting said pairs of pipes in end to end coaxial position,
    means for supporting a metal insert ring having complementary end surfaces in contact with the ends of respective pipes of each pair,
    means for applying compression between said pipes of each pair and said insert ring,
    means for rotating said insert ring about a common axis between said pipes and said insert ring for each of said pairs of pipes, said means for rotating said insert ring comprising a plurality of ring gears each of which surrounds and is in mesh with an insert ring whose edges frictionally engage the ends of the pipes of said given pairs to be frictionally welded, said ring gears being in mesh with a driving gear at circumferentially spaced positions about said driving gear such that said means for rotating said driving gear simultaneously rotates the ring gears for each pair of pipes.

* * * * *